(12) United States Patent
Taylor et al.

(10) Patent No.: US 7,065,522 B2
(45) Date of Patent: *Jun. 20, 2006

(54) HIERARCHICAL DATA EXTRACTION

(75) Inventors: Michael John David Taylor, Bridgwater (GB); Gavin Charles William Lester, Chippenham (GB)

(73) Assignee: Oracle International Corporation, Redwood Shores, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/673,850

(22) Filed: Sep. 30, 2003

(65) Prior Publication Data

US 2004/0243564 A1    Dec. 2, 2004

(30) Foreign Application Priority Data

May 29, 2003   (GB) ................................ 0312324.7

(51) Int. Cl.
*G06F 7/00*    (2006.01)
(52) U.S. Cl. ......................................................... 707/3
(58) Field of Classification Search ................... 707/3, 707/4, 5, 104.1, 100, 6
See application file for complete search history.

(56) References Cited

U.S. PATENT DOCUMENTS

| 5,781,896 A | * | 7/1998 | Dalal | 707/2 |
| 6,064,999 A | * | 5/2000 | Dalal | 707/2 |
| 6,442,566 B1 | | 8/2002 | Atman et al. | |
| 6,477,525 B1 | * | 11/2002 | Bello et al. | 707/3 |
| 6,493,708 B1 | * | 12/2002 | Ziauddin et al. | 707/3 |
| 6,560,594 B1 | * | 5/2003 | Cochrane et al. | 707/2 |

FOREIGN PATENT DOCUMENTS

| EP | 1338979 A1 | 2/2002 |
| GB | 2354849 A | 9/1999 |
| WO | 01/080095 A3 | 4/2001 |

OTHER PUBLICATIONS

PL/SQL User's Guide and Reference, Version 2.0; Part No. 800-20-1292; Dec. 1992.

* cited by examiner

*Primary Examiner*—Sam Rimell
(74) *Attorney, Agent, or Firm*—Bingham McCutchen LLP

(57) ABSTRACT

A computer implemented method is provided for extracting hierarchical data from one or more tables in a database, the method comprises firstly receiving user input identifying, one or more tables in the database that contain the hierarchical data and the hierarchical structure of the hierarchical data. A Structured Query Language (SQL) statement is then generated using the user input received. The SQL statement is presented to the database for execution and the hierarchical data are then extracted from the database in response to the execution of the SQL statement.

11 Claims, 14 Drawing Sheets

| EMPNO | ENAME | JOB | MGR | HIREDATE | SAL | COMM | DEPTNO |
|---|---|---|---|---|---|---|---|
| 7369 | SMITH | CLERK | 7902 | 17-DEC-80 | 800 | 0 | 20 |
| 7499 | ALLEN | SALESMAN | 7698 | 20-FEB-81 | 1600 | 300 | 30 |
| 7521 | WARD | SALESMAN | 7698 | 22-FEB-81 | 1250 | 500 | 30 |
| 7566 | JONES | MANAGER | 7839 | 02-APR-81 | 2975 | 0 | 20 |
| 7654 | MARTIN | SALESMAN | 7698 | 28-SEP-81 | 1250 | 1400 | 30 |
| 7698 | BLAKE | MANAGER | 7839 | 01-MAY-81 | 2850 | 0 | 30 |
| 7782 | CLARK | MANAGER | 7839 | 09-JUN-81 | 2450 | 0 | 10 |
| 7788 | SCOTT | ANALYST | 7566 | 19-APR-87 | 3000 | 0 | 20 |
| 7839 | KING | PRESIDENT | NULL | 17-NOV-81 | 5000 | 0 | 10 |
| 7844 | TURNER | SALESMAN | 7698 | 08-SEP-81 | 1500 | 0 | 30 |
| 7876 | ADAMS | CLERK | 7788 | 23-MAY-87 | 1100 | 0 | 20 |
| 7900 | JAMES | CLERK | 7698 | 03-DEC-81 | 950 | 0 | 30 |
| 7902 | FORD | ANALYST | 7566 | 03-DEC-81 | 3000 | 0 | 20 |
| 7934 | MILLER | CLERK | 7782 | 23-JAN-82 | 1300 | 0 | 10 |

EMP

*FIG. 1*

| ORGNAME | MGR | EMPNO |
|---|---|---|
| ORG A | 7839 | 7566 |
| ORG A | 7839 | 7782 |
| ORG A | 7839 | 7698 |
| ORG A | 7782 | 7934 |
| ORG A | 7698 | 7499 |
| ORG A | 7698 | 7521 |
| ORG A | 7698 | 7900 |
| ORG A | 7698 | 7654 |
| ORG A | 7698 | 7844 |
| ORG A | 7566 | 7788 |
| ORG A | 7566 | 7902 |
| ORG A | 7902 | 7369 |
| ORG A | 7788 | 7876 |
| ORG X | 0 | 7788 |
| ORG A | 0 | 7839 |
| ORG X | 7788 | 7839 |
| ORG X | 7788 | 7782 |
| ORG X | 7788 | 7698 |
| ORG X | 7788 | 7566 |
| ORG X | 7788 | 7900 |
| ORG X | 7566 | 7654 |
| ORG X | 7566 | 7521 |
| ORG X | 7521 | 7934 |
| ORG X | 7521 | 7844 |
| ORG X | 7844 | 7499 |
| ORG X | 7844 | 7902 |
| ORG X | 7902 | 7369 |
| ORG X | 7369 | 7876 |

*FIG. 4*

| | | | | | |
|---|---|---|---|---|---|
| ORG A | 1 | 7839 | 7566 | 1 | 101 |
| ORG A | 2 | 7839 | 7782 | 1 | 101 |
| ORG A | 3 | 7839 | 7698 | 1 | 101 |
| ORG A | 4 | 7782 | 7934 | 1 | 101 |
| ORG A | 5 | 7698 | 7499 | 1 | 101 |
| ORG A | 6 | 7698 | 7521 | 1 | 101 |
| ORG A | 7 | 7698 | 7900 | 1 | 101 |
| ORG A | 8 | 7698 | 7654 | 1 | 101 |
| ORG A | 9 | 7698 | 7844 | 1 | 101 |
| ORG A | 10 | 7566 | 7788 | 1 | 101 |
| ORG A | 11 | 7566 | 7902 | 1 | 101 |
| ORG A | 12 | 7902 | 7369 | 1 | 101 |
| ORG A | 13 | 7788 | 7876 | 1 | 101 |
| ORG X | 14 | 0 | 7788 | 1 | 101 |
| ORG A | 15 | 0 | 7839 | 1 | 101 |
| ORG X | 16 | 7788 | 7839 | 1 | 101 |
| ORG X | 17 | 7788 | 7782 | 1 | 101 |
| ORG X | 18 | 7788 | 7698 | 1 | 101 |
| ORG X | 19 | 7788 | 7566 | 1 | 101 |
| ORG X | 20 | 7566 | 7900 | 1 | 101 |
| ORG X | 21 | 7566 | 7654 | 1 | 101 |
| ORG X | 22 | 7566 | 7521 | 1 | 101 |
| ORG X | 23 | 7521 | 7934 | 1 | 101 |
| ORG X | 24 | 7521 | 7844 | 1 | 101 |
| ORG X | 25 | 7844 | 7499 | 1 | 101 |
| ORG X | 26 | 7844 | 7902 | 1 | 101 |
| ORG X | 27 | 7902 | 7369 | 1 | 101 |
| ORG X | 28 | 7369 | 7876 | 1 | 101 |
| ORG X | 29 | 0 | 7788 | 2 | 101 |
| ORG X | 30 | 7788 | 7839 | 2 | 101 |
| ORG X | 31 | 7788 | 7782 | 2 | 101 |
| ORG X | 32 | 7788 | 7698 | 2 | 101 |
| ORG X | 33 | 7788 | 7566 | 2 | 101 |
| ORG X | 34 | 7782 | 7900 | 2 | 101 |
| ORG X | 35 | 7782 | 7654 | 2 | 101 |
| ORG X | 36 | 7782 | 7521 | 2 | 101 |
| ORG X | 37 | 7521 | 7934 | 2 | 101 |
| ORG X | 38 | 7521 | 7844 | 2 | 101 |
| ORG X | 39 | 7844 | 7499 | 2 | 101 |
| ORG X | 40 | 7844 | 7902 | 2 | 101 |
| ORG X | 41 | 7902 | 7369 | 2 | 101 |
| ORG X | 42 | 7369 | 7876 | 2 | 101 |
| ORG A | 43 | 0 | 7839 | 1 | 102 |
| ORG A | 44 | 7566 | 7788 | 1 | 102 |

FIG. 7

HIERARCHICAL DATA EXTRACTION

This invention relates to the extraction of hierarchical data from a database and, in particular, to the automatic generation of structured query language (SQL) code to achieve this.

Data are extracted from databases typically in one of two ways. The first way involves constructing a query, such as an SQL statement, to present to the database for execution. The query identifies to the database which data are required for extraction.

The second method involves using a query tool such as Oracle Discoverer which, in simple terms, represents a graphical user interface between the user and the database. The query tool receives user input in a simplified format and generates the query, for example in SQL, to present to the database and then presents the retrieved data to the user.

A problem exists with both these methods when they are used to extract hierarchical data from a database since it is extremely complicated for a user to generate the required SQL code to extract the data and query tools are unable to generate the special SQL statements required.

In accordance with one aspect of the present invention there is provided a computer implemented method for extracting hierarchical data from one or more tables in a database, the method comprising:
a. receiving user input identifying, at least, one or more tables in the database that contain the hierarchical data and the hierarchical structure of the hierarchical data;
b. generating a Structured Query Language (SQL) statement using the user input received in step (a);
c. presenting the SQL statement to the database for execution; and,
d. extracting the hierarchical data from the database in response to the execution of the SQL statement.

Hence, the invention provides a method for automatically generating the complex SQL required to extract hierarchical data from a database. The complexity involved is hidden from the user who in fact requires no knowledge of SQL in order to use the invention.

Typically, the user input identifying the hierarchical structure indicates at least a column of one of the database tables that represents the parent items of the hierarchical structure and a column of one of the database tables that represents the child items of the hierarchical structure.

In this case, the data value that is the top of the hierarchical structure may have a default value of NULL. Alternatively, the user input identifying the hierarchical structure may indicate the data value in the column representing the parent items that is the top of the hierarchical structure.

The user input identifying the hierarchical structure may also indicate at least one further column of one of the tables that further restricts the hierarchy.

The method may also be used to perform aggregation of values associated with the hierarchy. As such, prior to generating the SQL statement, further user input may be received, the user input indicating at least one column of one of the database tables on which leaf sum aggregation should be performed.

Alternatively, or in addition, prior to generating the SQL statement, further user input may be received, the user input indicating at least one column of one of the database tables on which tree sum aggregation should be performed.

In a preferred embodiment, the SQL statement is generated from the user input by:
i. constructing object SQL that will return all the database items identified by the user input;
ii. constructing object SQL that calculates the level of an item in the hierarchical structure;
iii. constructing object SQL that calculates the number of child items appendant to an item in the hierarchical structure; and,
iv. combining the object SQL of steps (i) to (iii) in a single object SQL statement.

When the SQL statement is generated from the user input in this way and leaf sum aggregation is to be performed, further object SQL that performs the leaf sum aggregation may be constructed and this further object SQL may be combined with the object SQL of steps (i) to (iii) in step (iv).

Alternatively, or in addition, when the SQL statement is generated as described and tree sum aggregation is to be performed, further object SQL that performs the tree sum aggregation is constructed and this further object SQL is combined with the object SQL of steps (i) to (iii) in step (iv).

The invention will typically be provided as a computer program comprising computer program code means adapted to perform the steps of the first aspect of the invention when said program is run on a computer.

Further, there may be provided a computer program product comprising program code means stored on a computer readable medium for performing a method according to the first aspect of the invention when said program product is run on a computer.

Some embodiments of the invention will now be described with reference to the accompanying drawings, in which:

FIG. 1 shows a table in a database defining a pig's ear hierarchy;

FIG. 4 shows the contents of one of the tables defining the hierarchy of FIG. 3;

Figure 3:
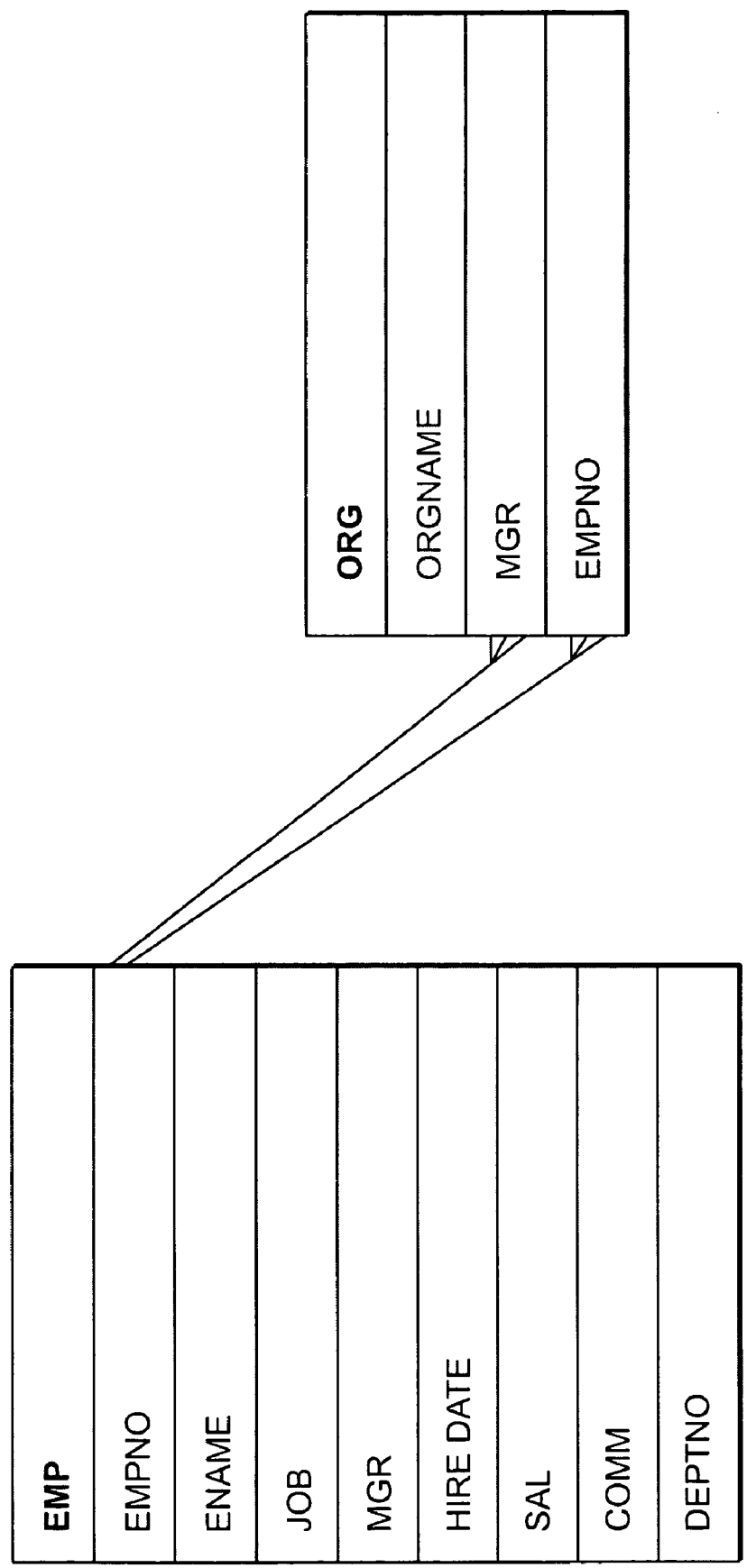
FIG. 3 shows a pair of database tables defining a simple matrix hierarchy.
Figure 5A:
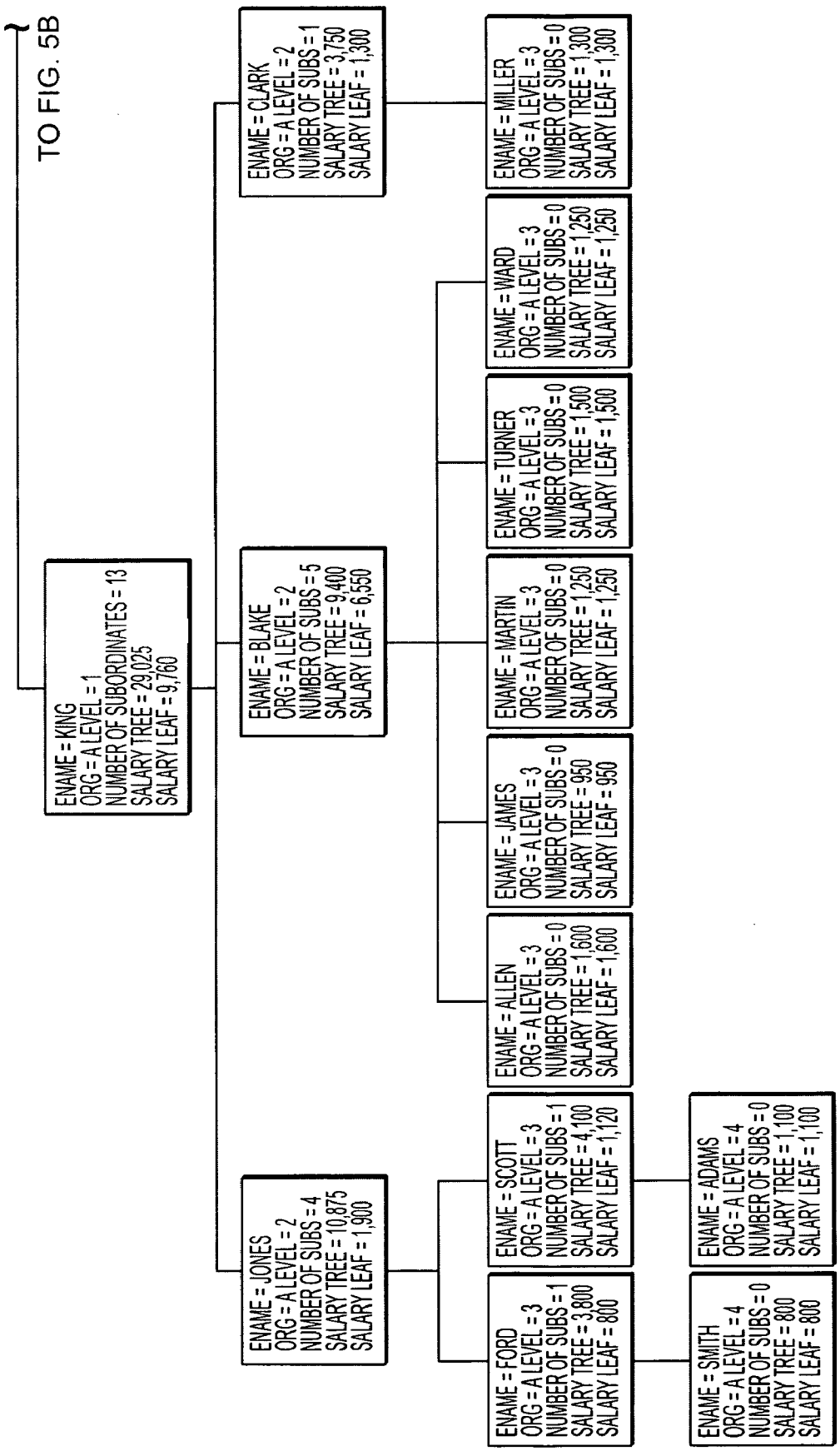
Figure 5B:
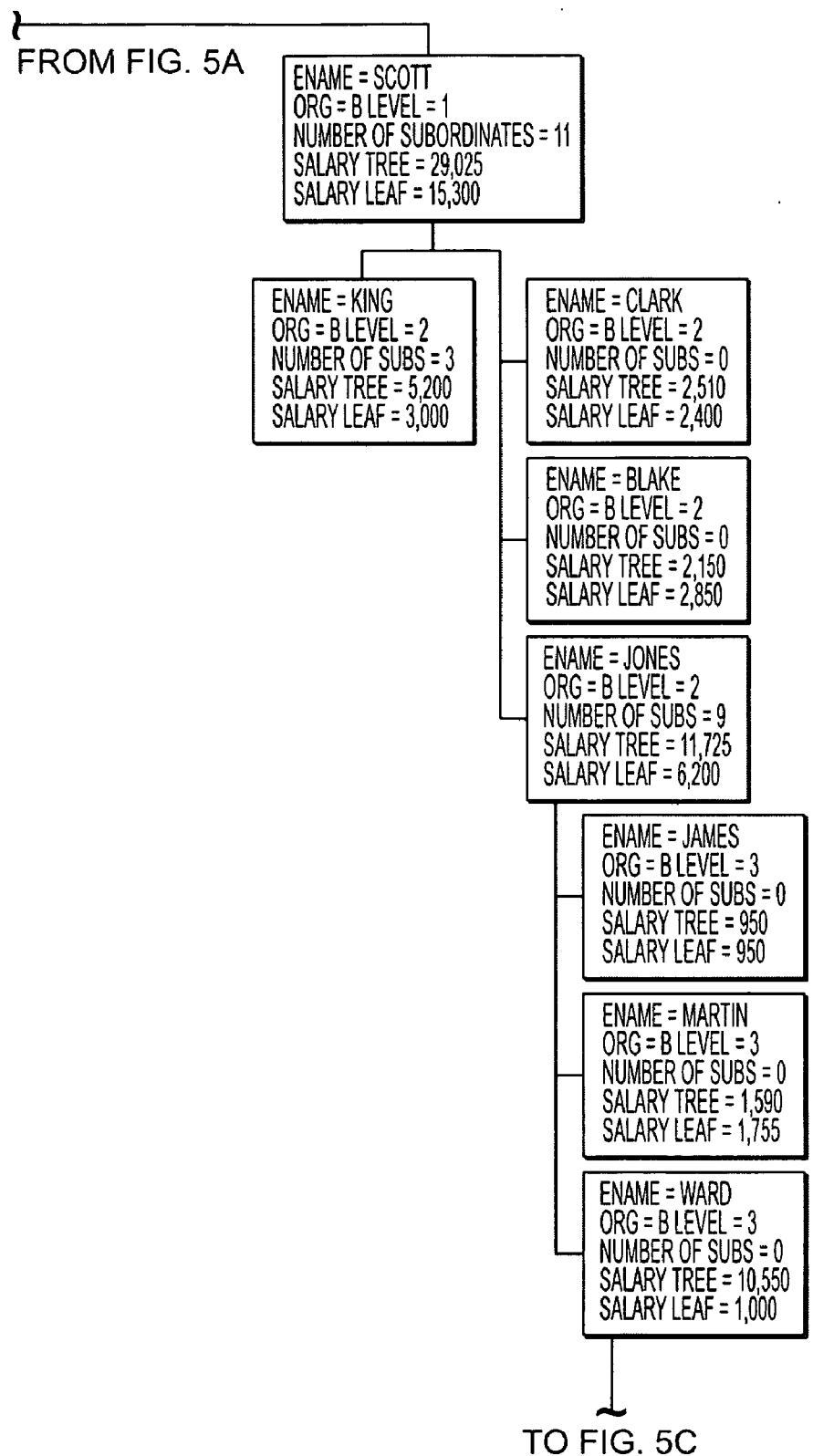
Figure 5C:
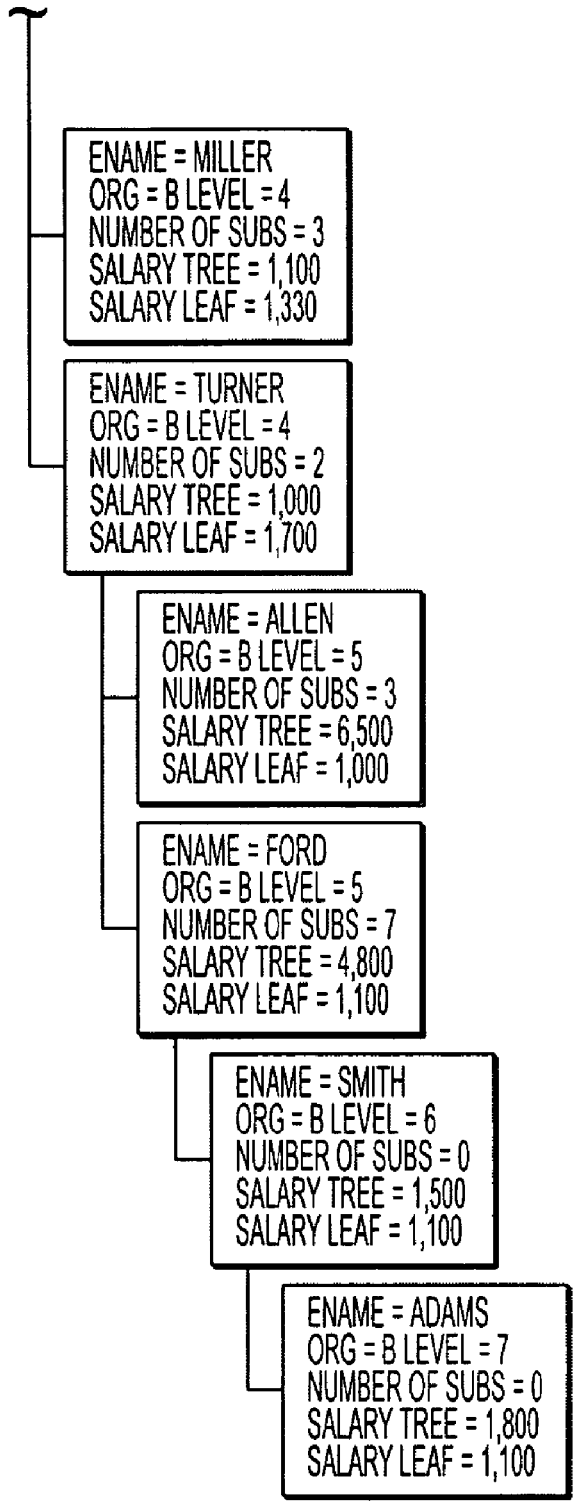
Figure 6:
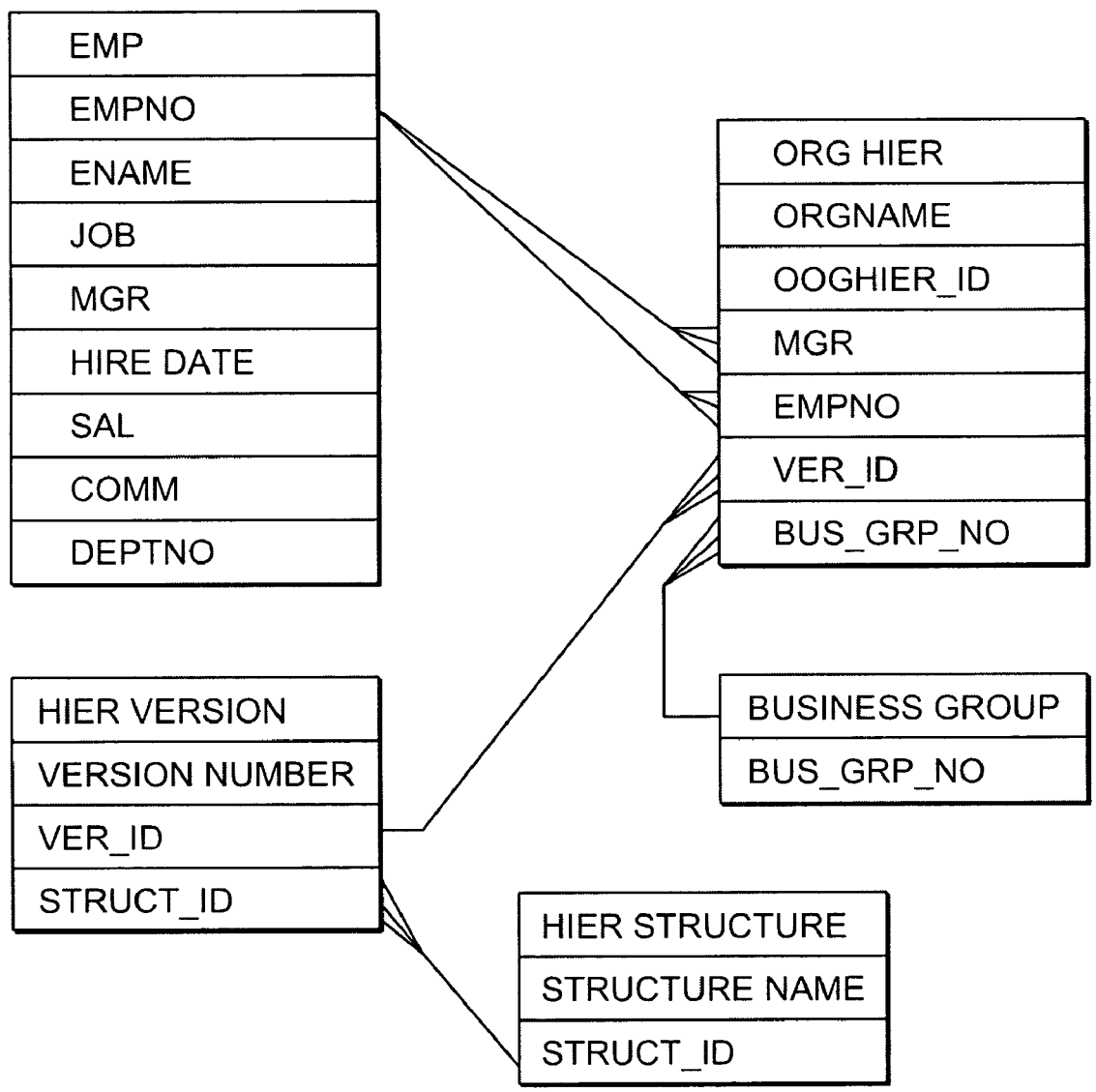
Figure 8A:
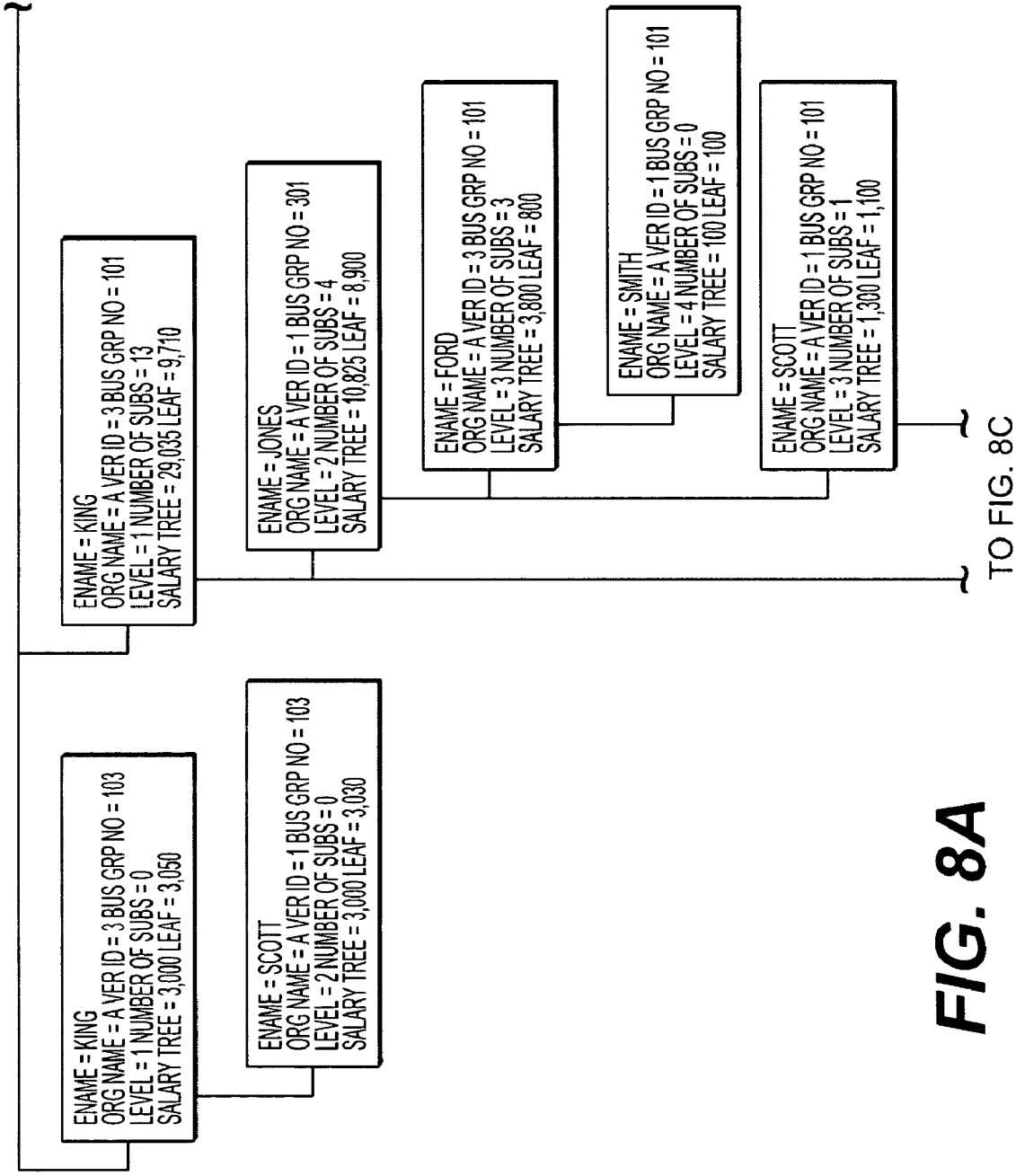
Figure 8B:
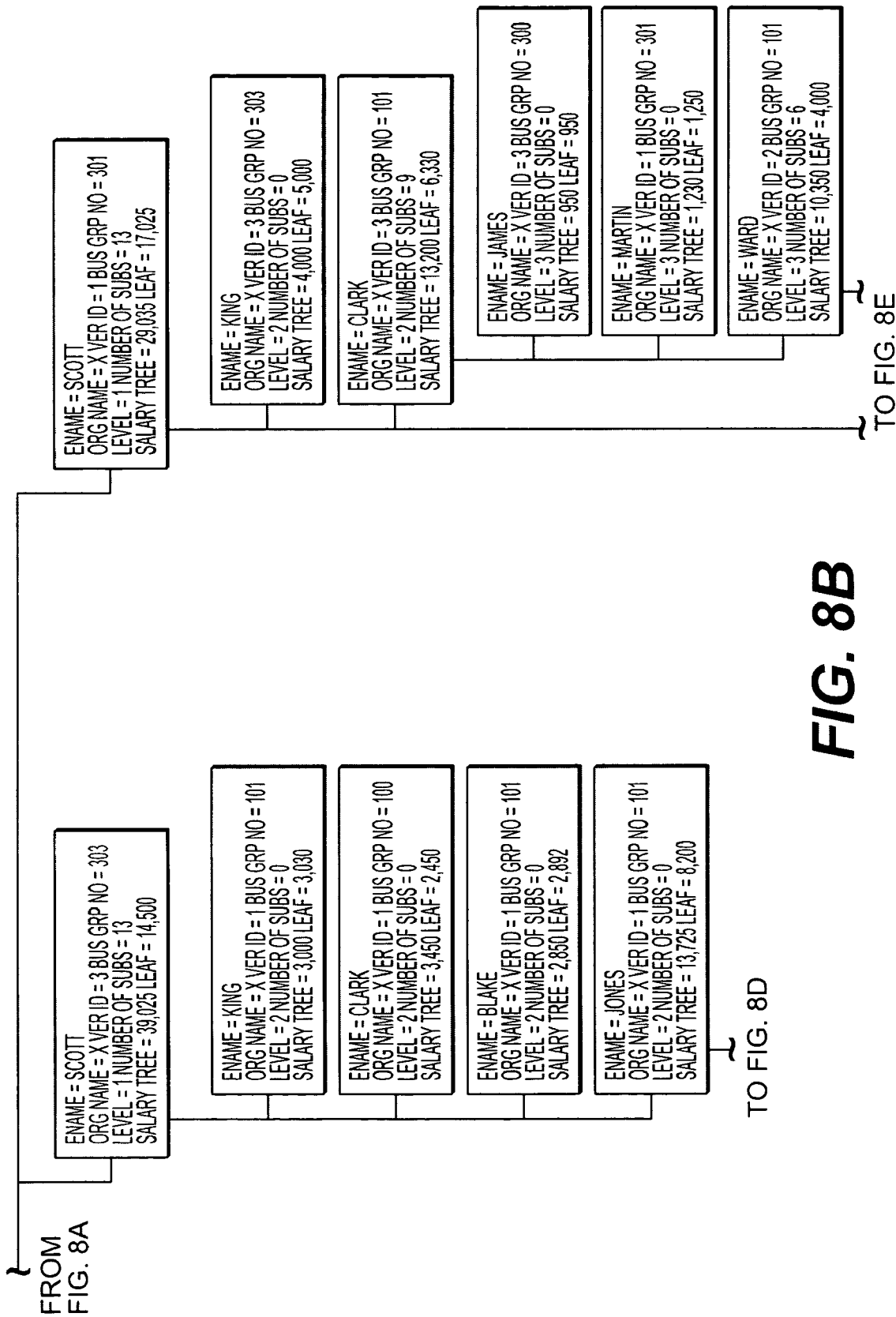
Figure 8C:
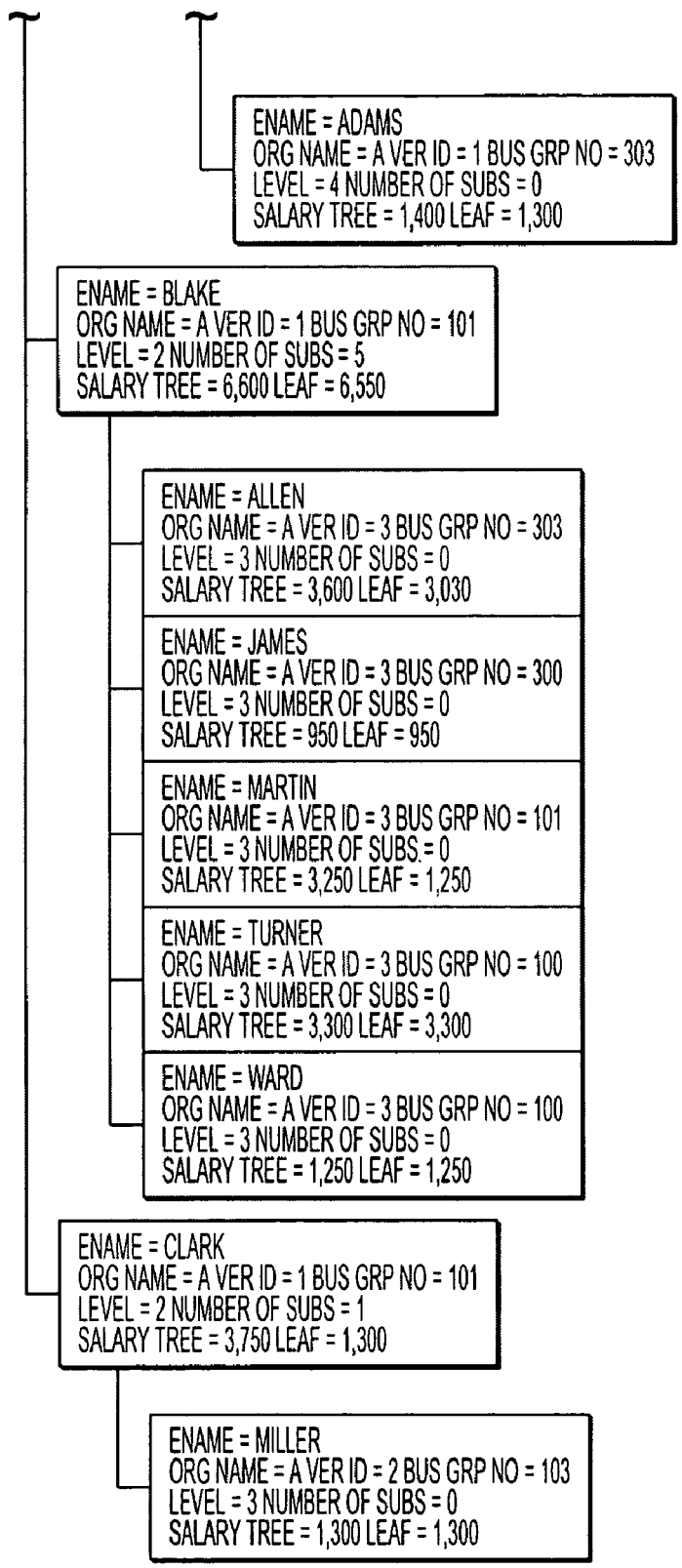
Figure 8D:
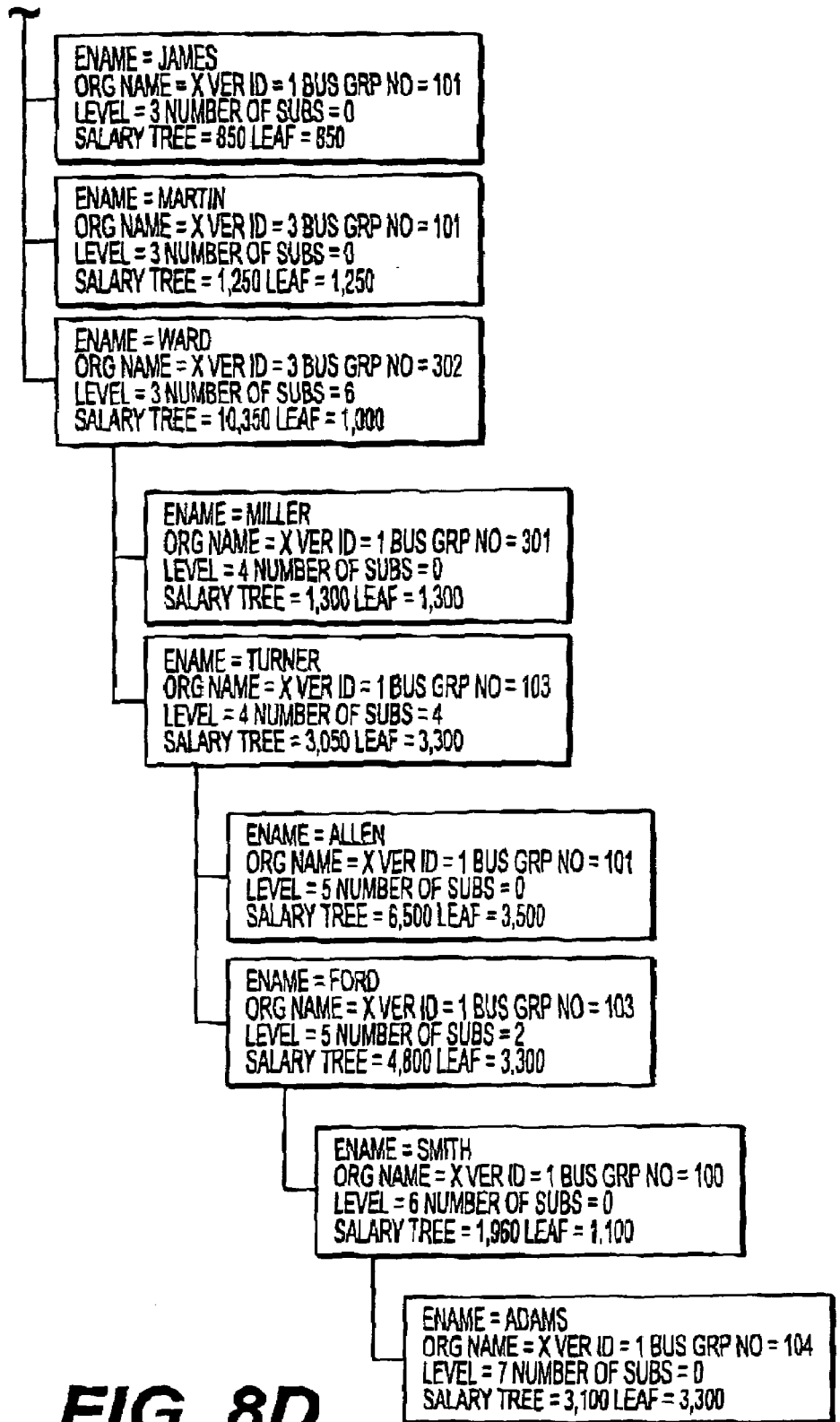
Figure 8E:
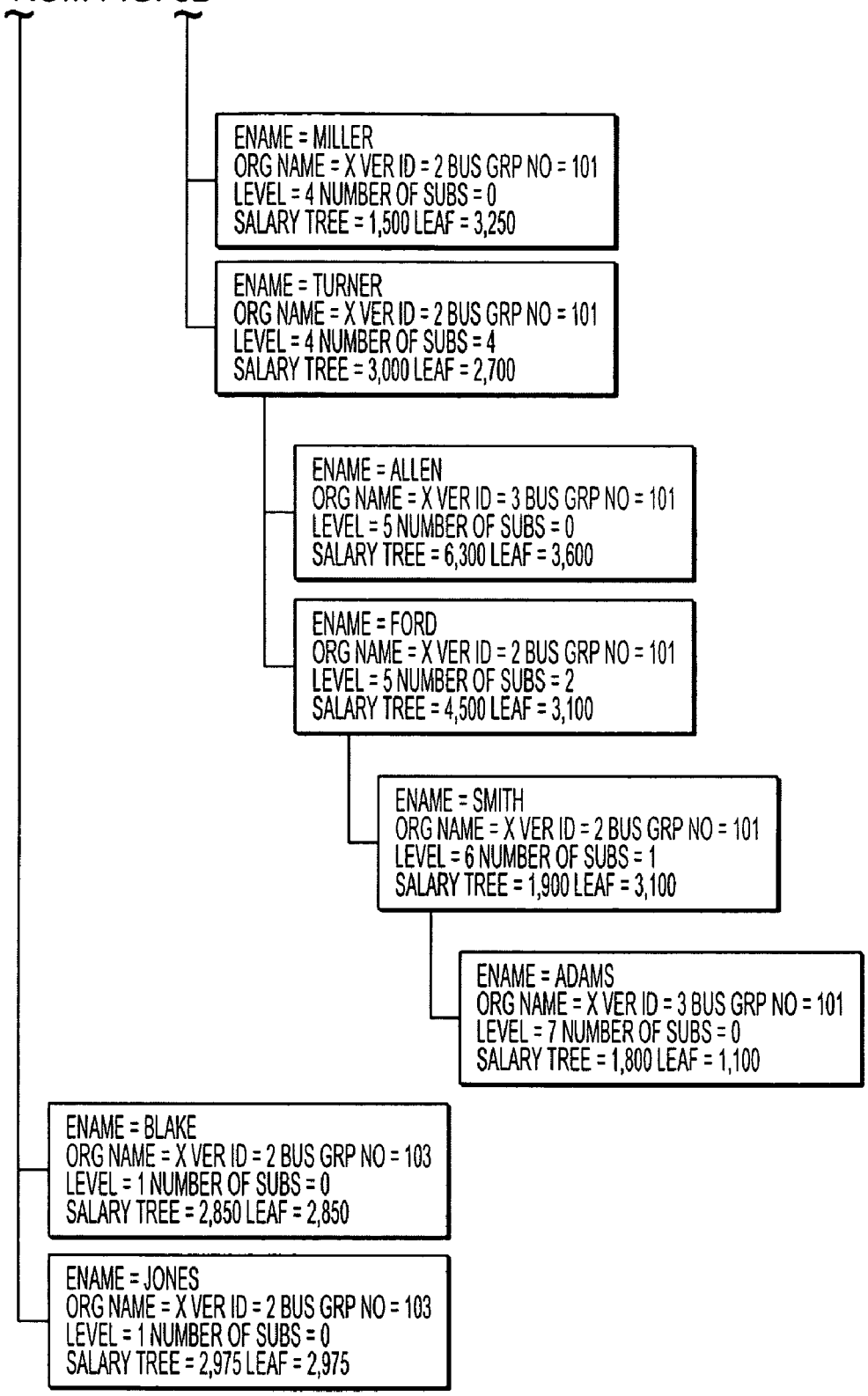

FIG. 5 indicates the structure according to the hierarchy of FIGS. 3 and 4;

FIG. 6 shows a set of tables defining a complex matrix value hierarchy;

FIG. 7 shows the contents of the ORG HIER table _of FIG. 5; and,

FIG. 8 indicates the structure of the hierarchy according to FIGS. 6 and 7.

In order to describe the embodiments of the invention fully, it is worthwhile first describing two types of hierarchical structure with which the invention may be used. It is important to realise however, that the invention is not restricted for use with only these types of hierarchical structure and a skilled person will realise that its use can be extended to other structures.

Whilst the embodiments below are presented with reference to "tables", it will be understood that these can also be thought of as database "views".

FIG. 1 shows a table designated EMP having eight columns under which data relating to the employees of a company are listed. Of particular interest are the columns EMPNO, ENAME and MGR. The values in the ENAME column are the names of the individual employees whilst the EMPNO and MGR columns gives their employee numbers and the employee numbers of their manager respectively.

Each row in the table has a unique value of EMPNO and a corresponding value of MGR. This value of MGR refers to another value of EMPNO since the EMPNO and MGR columns are joined. For example, the value of EMPNO for the employee named SMITH is 7369 and the corresponding MGR value is 7902. This MGR value corresponds to EMPNO value of 7902 which is that of the employee named FORD. In essence, this table defines the hierarchical structure of the company. Such a hierarchy is known as a pig's ear hierarchy and is characterised by a join from one column of a table to a different column of the same table. The main disadvantage of this kind of hierarchical structure is that the structure itself is mixed in with other data and so, supporting more than one hierarchy requires duplication of data.

Figure 2:
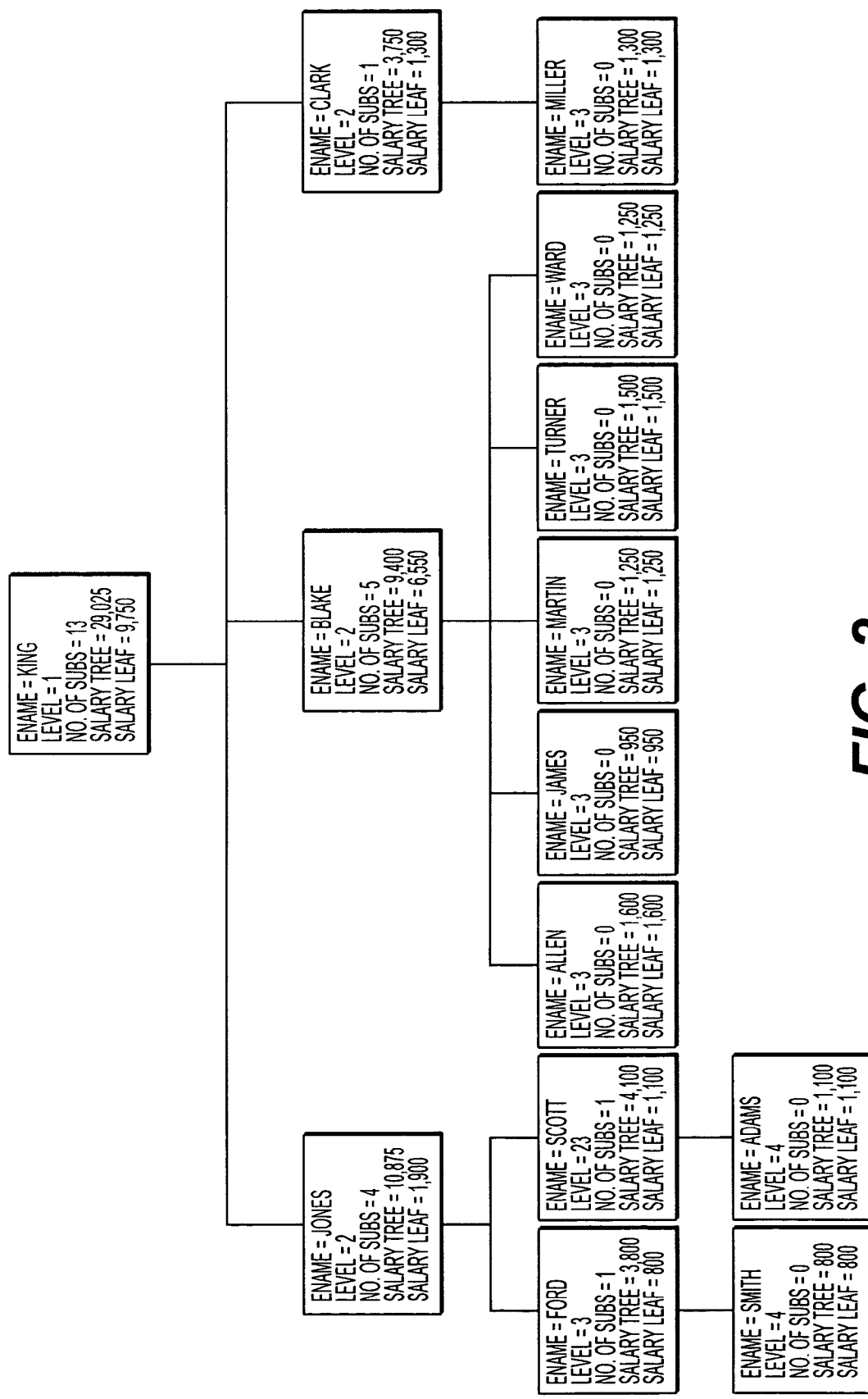
FIG. 2 shows the hierarchical structure of the hierarchy defined by the table of FIG. 1.

The resultant structure described by this table is shown in FIG. 2 in which it can be seen that the employee with an ENAME value of KING is the top of the hierarchy (with an MGR value of NULL). The employees with ENAME values of JONES, BLAKE and CLARK all have corresponding MGR values of 7839 and this corresponds to the EMPNO value of KING and so these three employees form the second level of the hierarchy as shown in FIG. 2. Subsequent levels of the hierarchy are built up in the same manner.

The second type of hierarchical structure that will be described is a matrix hierarchy. This overcomes the disadvantage of pig's ear hierarchies since the hierarchy data is separated from the other data in its own hierarchy table. This allows for an unlimited number of hierarchical structures to be created on the same data therefore enabling, amongst other things, version control of hierarchies and complex data modelling.

An example of a matrix hierarchy is shown in FIG. 3 which shows two tables named EMP and ORG. Only the columns that exist in each table are shown in FIG. 3. The associated data are not shown. The table EMP is analogous to that shown in FIG. 1 whilst the table ORG also has the columns EMPNO and MGR but has a second column known as ORGNAME. In this example, the EMPNO column of table EMP is joined to the corresponding EMPNO column of table ORG which has corresponding values. The corresponding values of MGR in table ORG are then joined back to the EMPNO column of table EMP. The third column ORGNAME stores the name of the organisation and therefore allows for multiple hierarchies to be created, for example where the same employees may be working on different projects simultaneously then the ORGNAME column could refer to these different projects. An example of data that may be stored in this table ORG is shown in FIG. 4 which shows two different organisations listed under the ORGNAME column with the names ORG A and ORG X. The values of EMPNO and the corresponding MGR values are listed next to these in order to define the hierarchies. The hierarchical structure according to this matrix example is shown in FIG. 5.

A matrix hierarchy may be used for more complicated hierarchical structures than simple parent-child relationships as previously described. For example, FIG. 6 shows a set of tables defining complex matrix hierarchy. In this example, the ORG HIER table is similar to the ORG table of FIG. 3 but has three further columns ORGHIER_ID, VER_ID and BUS_GRP_NO. The ORGHIER_ID column is a unique key for each row of this table. The VER_ID column is joined to the corresponding column in a table known as HIER VERSION which has further columns known as VERSION NUMBER and STRUCT_ID. This latter column is further joined to a corresponding column in a table known as HIER STRUCTURE which has a second column known as STRUCTURE NAME. The BUS_GRP_NO column of table ORG is joined to a corresponding column in a table BUSINESS GROUP. As such, hierarchies having multiple version numbers within multiple hierarchical structures and all within multiple business groups can be described. Further details of the ORG HIER table are provided in FIG. 7 whereas the overall hierarchy according to this example is shown in FIG. 8.

This invention is concerned with the extraction of hierarchical data from tables in a database that contain such data. The data required may simply be the level in the hierarchy which an item occupies or the number of subordinates that each item in the hierarchy has. Further, the invention can also perform aggregation functions.

In particular, the invention can calculate the tree some and leaf sum aggregates for a hierarchical structure. These aggregates are explained below by example.

Referring to FIG. 2, the leaf sum and tree sum SAL aggregates for the employee called SMITH are 800. They equal the value of SAL for SMITH since he has no subordinates. SMITH reports to FORD for whom the leaf sum aggregate is also 800 being equal to the sum of the values in the SAL column for each of FORD's subordinates, in this case SMITH. The value of SAL for FORD is 3000 and therefore the tree sum aggregate of SAL for FORD is 3800.

FORD reports to JONES for whom the leaf sum aggregate of SAL is 1900 being equal to the sum of the values in the SAL column for each of JONES' immediate subordinates, FORD and SCOTT, only. The values in the SAL column for SMITH and ADAMS are relevant to the leaf sum aggregate of JONES. The tree sum aggregate for JONES is the sum of the values of the SAL column for JONES and all his subordinates.

In order to generate an SQL statement for extracting the data required, a user is first required to input various items to indicate, amongst other things, the table that holds the hierarchy data and the columns in the table that hold the parent and child identifiers, thereby identifying the hierarchical structure. The data may be input in various ways. For example, it may be input through a graphical user interface or alternatively, it may form the rows of a database table which are referred to by software performing the invention.

The entry of the user input and the subsequent construction of the SQL object for retrieving the hierarchical data will be described with reference to two examples. The first example, Example 1, is based on the simple pig's ear hierarchy of FIGS. 1 and 2 and the second example, Example 2, is based on the complex matrix hierarchy shown in FIG. 6.

The first three user input items that must be received by the software for performing the invention are mandatory. These items are respectively the name of the table that holds the hierarchy data (referred to as User Input 1), the name of a column on the table that holds the parent items (referred to as User Input 2) and a column on the table that holds the child items (referred to as User Input 3). If only these data items are input by the user then the software according to the invention will merely extract the level and number of subordinates for each parent item in the table.

The remaining items of user input are all optional. The first optional item is a start value that identifies the data value in the parent items that indicates the top of the hierarchy (referred to as User Input 4). This has a default value of NULL if no user assigned value is provided. The next user input item (referred to as User Input 5) is used to identify another column in the table that further restrict the hierarchy. If none exists then this item is not provided. Alternatively, the user can enter multiple columns for this user input item.

The next optional user input item (referred to as User Input 6) identifies the columns of the table or view that contain numerical values for which the user wishes to perform tree sum or leaf sum aggregation. If there are none then this item is not provided. Alternatively, the user may enter multiple columns for this item.

The final item (referred to as User Input 7) identifies the column that uniquely identifies the rows of the table that contains the child and parent items. For example, this may be the primary key. If there is no column on this table that does this then this item is not provided. In this case, the unique identifier for the row will be formed from a composite key consisting of the child item and the items of User Input referred to by User Input 5.

The table below shows for the purposes of Example 1 and Example 2 the values that are input for each of these user input items with respect to both examples:

| User Input Item | Example 1 | Example 2 |
| --- | --- | --- |
| User Input 1 | EMP | ORG_HIER |
| User Input 2 | MGR | MGR |
| User Input 3 | EMPNO | EMPNO |
| User Input 4 | | 0 |
| User Input 5 | | VER_ID, BUS_GRP_NO |
| User Input 6 | SAL, COMM | |
| User Input 7 | EMPNO | ORGHIER_ID |

The construction of the SQL object for extracting the level in the hierarchy for each item, the number of subordinates that it has and tree and leaf sum aggregation, if appropriate, can be broken down into the generation of the following distinct SQL segments.

Firstly, an initial SQL statement is constructed that selects the database items identified from the user input. This SQL object is then used in the creation of the other SQL segments.

The first SQL segment that is constructed is that which performs the aggregation of the user identified numerical data for leaf and tree sum aggregation.

The next segment is object SQL that calculates the levels for each item in the data hierarchy.

The next segment is object SQL that calculates and extracts the number of subordinates for each item in the hierarchy.

Object SQL is then generated that combines all of the above SQL segments into a single statement for execution on the database in order to extract the results required.

The combined SQL statement may be turned into a SQL object in the form of a database view. This is described later with reference to Example 2.

In order to construct the initial SQL statement referred to above, the users input (as shown in the above table) is taken and a basic SQL object is built from it. If no values exist for User Inputs 5 or 6 then they are excluded from this SQL object. If more than one column has been provided for User Inputs 5 or 6 then they are all included in a comma separated format. If the value specified for User Input 7 has already been specified in any of the other user input fields then User Input 7 is not included in the construction of the SQL object. For instance, in example 1 the value of User. Input 7 is the same as the value for User Input 3. Once the SQL object has been constructed it can be validated against the database. This object is used in the generation of all the other SQL segments.

The following SQL statement is used to construct the basic SQL object:

(SELECT 'ǁUser_Input2ǁ', 'ǁUser_input3ǁ', 'ǁUser_input5ǁ', 'ǁUser_input6ǁ', 'ǁUser_input7ǁ' FROM 'ǁUser_input1ǁ')

This provides the following SQL statements for Example 1:

(SELECT MGR, EMPNO, SAL, COMM FROM EMP)

and for Example 2:

(SELECT MGR, EMPNO, VER_ID, BUS_GRP_NO, ORG_NAME, ORGHIER_ID FROM ORG_HIER)

The first SQL segment to be generated is that for calculating tree sum and leaf sum aggregate values. These are later incorporated with the SQL segments that perform the hierarchy level and number of subordinates calculations and placed in a single SQL object.

This requires the SQL code generated to perform multiple passes (queries) on the same data within a single query operation. This is achieved by separating the SQL segments that calculate the tree sum and leaf sum aggregates from the SQL segments that calulate the hierarchy level and number of subordinates. The tree and leaf sum aggregation SQL segments are generated separately, in this case as SQL objects held in a PLSQL function. However, the skilled person will realise that other methods may be used.

These functions are first generated separately then called by the SQL segment that calculates the hierarchy level. Therefore, during the execution of the hierarchy level SQL segment, for each row returned, the tree sum and leaf sum aggregation SQL segments are executed. This allows for multiple passes/queries to be performed on the same data.

The SQL required to calculate the tree sum is different from that required to calculate the leaf sum. Other forms of value hierarchy aggregation can also be implemented using this methodology.

Firstly, the generation of a SQL segment for calculating the tree sum aggregate will be described. If no values exist for User Input 6 then no tree sum SQL segment is generated. If there are values for User Input 6 then a dynamic SQL statement is created for each value entered in User Input 6. This dynamic SQL accepts a parameter value 'Parameter_Input' which refers to the item for which tree sum aggregation is to be performed. This parameter value is populated when the function is called from the dynamically generated SQL segment that performs the calculation of hierarchy level described later.

The following SQL statement constructs the SQL segment for performing the tree sum aggregation:

'SELECT SUM('ǁUser_input_6ǁ') FROM ('ǁ<INSERT BASIC SQL OBJECT GENERATED ABOVE>ǁ') CONNECT BY PRIOR 'ǁUser_input_3ǁ'='ǁUser_input_2ǁ' START WITH 'ǁUser_input_3ǁ'='ǁParameter_Inputǁ';'

In the case of Example 1, since User Input 6 has two values (SAL and COMM), executing this SQL statement generates two SQL segments, one for the SAL column and one for the COMM column. These are:

SELECT SUM(SAL), FROM (SELECT MGR, EMPNO, SAL, COMM FROM EMP) CONNECT BY PRIOR EMPNO=MGR START WITH EMPNO=Parameter_Input; and SELECT SUM(COMM), FROM (SELECT MGR, EMPNO, SAL, COMM FROM EMP) CONNECT BY PRIOR EMPNO=MGR START WITH EMPNO=Parameter_Input;

User Input 6 is not provided for Example 2 and so no SQL is generated for calculating leaf sum aggregates.

The SQL segment generated above is wrapped in a function that is called for each row returned by the SQL that calculates the hierarchy level. The wrapper used in this case is a PLSQL function but other types of wrappers could be used. The PLSQL function wrapper is dynamically generated using the following SQL statement:

CREATE OR REPLACE FUNCTION tree_' ||User_input_6||' (Parameter_Input IN varchar2) RETURN NUMBER IS tree_aggregate number (10); CURSOR c1 (CHILDIN varchar2) IS '||<INSERT ABOVE SQL SEGMENT FOR PERFORMING TREE SUM AGGREGATION>||' BEGIN OPEN c1 (Parameter_Input); FETCH c1 INTO tree_aggregate; CLOSE c1; RETURN (tree_aggregate); END TREE_' ||User_input_6||';

The function is then dynamically created against the database. In the case of Example 1, this generates two SQL segments, one for SAL and one for COMM:

CREATE OR REPLACE FUNCTION tree_SAL(Parameter_Input IN varchar2 RETURN NUMBER IS tree_aggregate number(10); CURSOR c1 (CHILDIN varchar2) IS SELECT SUM (SAL), FROM (SELECT MGR, EMPNO, SAL, COMM FROM EMP) CONNECT BY PRIOR EMPNO=MGR START WITH EMPNO=Parameter_Input; BEGIN OPEN c1 (Parameter_Input); FETCH c1 INTO tree_aggregate; CLOSE c1; RETURN(tree_aggregate); END tree_SAL; and CREATE OR REPLACE FUNCTION tree_COMM(Parameter_Input IN varchar2) RETURN NUMBER IS tree_aggregate number(10); CURSOR c1 (childin varchar2) IS SELECT SUM(COMM), FROM (SELECT MGR, EMPNO, SAL, COMM FROM EMP) CONNECT BY PRIOR EMPNO=MGR START WITH EMPNO=Parameter_Input; BEGIN OPEN c1 (Parameter_Input); FETCH c1 INTO tree_aggregate; CLOSE c1; RETURN(tree_aggregate); END tree_COMM;

User Input 6 is not provided for Example 2 and so no SQL is generated for calculating leaf sum aggregates.

The generation of the SQL segment for performing leaf sum aggregation is implemented in a similar way to that for performing tree sum aggregation although it is more complex. Again, if no values are entered for User Input 6 then no leaf sum aggregation function is generated. If there are values for 'User Input 6' then a dynamic SQL statement is created for each value entered in User Input 6. This dynamic SQL statement accepts a parameter value 'Parameter_Input'. This parameter value is populated when the function is called from the dynamically generated SQL statement for calculating the hierarchy level, as described later.

The following SQL statement constructs the SQL segment for performing the tree sum aggregation:

SELECT SUM('||User_input_6||') FROM ('||<INSERT BASIC SQL OBJECT GENERATED ABOVE>||') A WHERE '||User_input_3||' IN (select B.'||User_input_3||' FROM ('||<INSERT BASIC SQL OBJECT GENERATED ABOVE>||') B WHERE NOT EXISTS (SELECT C.'||User-input_6||' FROM ('||<INSERT BASIC SQL OBJECT GENERATED ABOVE>||') C WHERE C.'||User_input_2||'=B.'||User_input_3||') CONNECT BY PRIOR B.'||User_input_3||'=B.'||User_input_2||' START WITH B.'||User_input_3||'=Parameter_Input');

In the case of Example 1, since User Input 6 has two values (SAL and COMM), this SQL statement generates two SQL segments, one for SAL and one for COMM. These are:

SELECT SUM(SAL) FROM (SELECT MGR, EMPNO, SAL, COMM FROM EMP) A WHERE EMPNO IN (SELECT B.EMPNO FROM (SELECT MGR, EMPNO, SAL, COMM FROM EMP) B WHERE NOT EXISTS (SELECT C.SAL FROM (SELECT MGR, EMPNO, SAL, COMM FROM EMP) C WHERE C.MGR=B.EMPNO) CONNECT BY PRIOR B.EMPNO=B.MGR START WITH B.EMPNO=Parameter_Input); and SELECT SUM(COMM) FROM (SELECT MGR, EMPNO, SAL, COMM FROM EMP) A WHERE EMPNO IN (SELECT B.EMPNO FROM (SELECT MGR, EMPNO, SAL, COMM FROM EMP) B WHERE NOT EXISTS (SELECT C.COMM FROM (SELECT MGR, EMPNO, SAL, COMM FROM EMP) C WHERE C.MGR=B.EMPNO) CONNECT BY PRIOR B.EMPNO=B.MGR START WITH B.EMPNO=Parameter_Input);

User Input 6 is not provided for Example 2 and so no SQL is generated for calculating tree sum aggregates.

The SQL segments generated are wrapped in a function that is called for each row returned by the SQL segment that calculates the hierarchy level. The wrapper used in this case is a PLSQL function but other types of wrappers could be used. The PLSQL function wrapper is dynamically generated using the following SQL statement:

CREATE OR REPLACE FUNCTION leaf_'||User_input_6||'(Parameter_Input IN varchar2) RETURN NUMBER IS leaf_aggregate number (10); CURSOR c1 (CHILDIN varchar2) is '||<INSERT ABOVE SQL SEGMENT FOR PERFORMING LEAF SUM AGGREGATION>||' BEGIN OPEN c1 (Parameter_Input); FETCH c1 INTO leaf_aggregate; CLOSE c1; RETURN (leaf_aggregate); END leaf_'||User_input_6||';

The function is then dynamically created against the database. In the case of Example 1, this generates two SQL segments, one for SAL and one for COMM:

CREATE OR REPLACE FUNCTION leaf_SAL(Parameter_Input IN varchar2) RETURN NUMBER IS leaf_aggregate NUMBER (10); CURSOR c1 (childin varchar2) IS SELECT SUM(SAL) FROM (SELECT MGR, EMPNO, SAL, COMM FROM EMP) A WHERE EMPNO IN (SELECT B.EMPNO FROM (SELECT MGR, EMPNO, SAL, COMM FROM EMP) B WHERE NOT EXISTS (SELECT C.SAL FROM (SELECT MGR, EMPNO, SAL, COMM FROM EMP) C WHERE C.MGR=B.EMPNO) CONNECT BY PRIOR B.EMPNO=B.MGR START WITH B.EMPNO=PARAMETER_INPUT); BEGIN OPEN c1 (Parameter_Input); FETCH c1 INTO leaf_aggregate; CLOSE c1; RETURN(leaf_aggregate); END leaf_SAL;

CREATE OR REPLACE FUNCTION leaf_COMM(Parameter_Input IN varchar2) RETURN NUMBER IS leaf_aggregate NUMBER (10); CURSOR c1 (childin varchar2) IS SELECT SUM(COMM) FROM (SELECT MGR, EMPNO, SAL, COMM FROM EMP) A WHERE EMPNO IN (SELECT B.EMPNO FROM (SELECT MGR, EMPNO, SAL, COMM FROM EMP) B WHERE NOT EXISTS (SELECT C.COMM FROM (SELECT MGR, EMPNO, SAL, COMM FROM EMP) C WHERE C.MGR=B.EMPNO) CONNECT BY PRIOR B.EMPNO=B.MGR START WITH B.EMPNO=PARAMETER_INPUT); BEGIN OPEN c1 (Parameter_Input); FETCH c1 INTO leaf_aggregate; CLOSE c1; RETURN(leaf_aggregate); END leaf_COMM;

User Input 6 is not provided for Example 2 and so no SQL is generated for calculating tree sum aggregates.

Once the PLSQL functions have been generated they are created against the database.

The construction of the SQL for calculating the hierarchy level incorporating the tree and leaf sum aggregate functions consists of generating two SQL select statements. The first is an SQL statement for calculating the hierarchy level and calling the aggregate functions. The second is an SQL statement for calculating the hierarchy level combined with the aggregate values.

These SQL statements are then combined using inline views to create a single SQL statement that calculates the hierarchy level and the tree and leaf sum aggregate values. If no values are provided for User Input 6 then the SQL statements only calculate the hierarchy level.

The first SQL statement is used to calculate the hierarchy level and call the dynamically created functions that calculate the tree and leaf sum aggregates.

The number of aggregate functions created will depend on the number of values entered by the user for User Input 6. The number of aggregation functions affects the dynamic creation of the SQL SELECT clause. The higher the number of aggregate items, the longer the SELECT clause will be. There is a repeating pattern to the creation of this SELECT clause. Each aggregate item creates two functions, one to find the leaf sum aggregate and one to find the tree sum aggregate.

The following string, known as the aggregate function string, is generated for each aggregate item entered into User Input 6:

tree_' ‖User_input_6‖'('‖User_input_3‖')' AS "'‖User_input_6‖'_treesum", leaf_' ‖User_input_6‖' ('‖User_input_3‖')' AS "'‖User_input_6‖'_leafsum"

In the case of Example 1, this string is generated for each value of User Input 6, SAL and COMM, and the resultant two strings are concatenated:

tree_SAL(EMPNO) AS "SAL_treesum", leaf_SAL (EMPNO) AS "SAL_leafsum", tree_COMM(EMPNO) AS "COMM_treesum", leaf_COMM(EMPNO) AS "COMM_leafsum", User Input 6 is not provided for Example 2 and so the strings are not generated.

The following string, known as the key items string, is generated for each value entered for User Input 5:

‖User_input_5‖ AS "'‖User_input_5‖'"

If no values are entered for User Input 5 then this string is not created. Since, User Input 5 is not provided for Example 1 and so the strings are not generated.

With respect to Example 2, two values are provided for User Input 5 and so these two values are included in the string:

BUS_GRP_NO AS "BUS_GRP_NO", VER_ID AS "VER_ID",

If a user has identified and input a primary key for User Input 7 then a string, known as the primary key string, is created as follows:

‖User_input_7‖ AS "'‖User_input_7‖'_pk",'

If no values are entered for User Input 7 then this string is not created.

In the case of Example 1, the following string is created:

EMPNO AS "EMPNO_pk"

In the case of Example 2, the following string is created:

ORGHIER_ID as "ORGHIER_ID_pk"

The user is required to identify the start point of the hierarchy via User Input 4. If no value is given for this then a default value of NULL is assumed. However, if a value is given then a string, known as the start point string, is generated as follows:

'='‖User_input_4

If no value or NULL is entered then the string is generated as:

'IS NULL'

Therefore, with respect to Example 1, the following string is created:

IS NULL

In Example 2, the start point is defined as the value "0" and so the string is created as:

=0

The next string, known as the CONNECT BY string, to be created is made up of the values entered for User Input 5 concatenated with the parent items and the child items values entered for User Inputs 2 and 3 respectively as shown below:

User_input_5‖' ‖ '‖ User_input_3‖'='‖ User_input_5‖' ‖ '‖ User_input_2

If no values exist for 'User Input 5' then the following string is created instead:

User_input_3‖'='‖User_input_2

If more than one value exists for 'User Input 5' then the strings created for each item are concatenated.

With respect to Example 1, no User Input 5 values exist and so the following string is created:

EMPNO=MGR

In Example 2, two values exist for User Input 5 and so two strings are created and concatenated:

VER_ID‖BUS_GRP_NO‖EMPNO=VER_ID‖BUS_GRP_NO‖MGR

An SQL statement is then created from, the strings created above as shown below:

(SELECT LEVEL AS LVL, <INSERT KEY ITEMS STRING>, <INSERT AGGREGATE FUNCTIONS STRING>,<INSERT PRIMARY KEY STRING>, '‖User_input_2‖' As "' ‖User_input_2‖' ", '‖User_input_3‖' AS "'‖User_input_2‖' " FROM '‖<INSERT BASIC SQL OBJECT GENERATED ABOVE>‖' B CONNECT BY PRIOR '<INSERT CONNECT BY STRING>' START WITH '‖User_input_2‖' <INSERT START POINT STRING>)

This SQL statement can then be validated against the database to check that the SQL syntax construction is correct.

For Example 1, this creates the following SQL statement:

(SELECT LEVEL AS LVL, TREE_SAL(EMPNO) AS "SAL-TREESUM", LEAF_SAL(EMPNO) AS "SAL_LEAFSUM", TREE_COMM(EMPNO) AS "COMM_TREESUM", LEAF_COMM(EMPNO) AS "COMM_LEAFSUM", EMPNO AS "EMPNO_PK", MGR AS "MGR" FROM (SELECT MGR, EMPNO, SAL, COMM FROM EMP) B CONNECT BY PRIOR (EMPNO=MGR) START WITH MGR IS NULL)

For Example 2, the following SQL statement is generated:

(SELECT LEVEL AS LVL, BUS_GRP_NO AS "BUS_GRP_NO", VER_ID AS "VER_ID", ORGHIER_ID AS "ORGHIER_ID_pk", MGR AS "MGR", EMPNO AS "EMPNO", FROM (SELECT MGR, EMPNO, VER_ID, BUS_GRP_NO, ORG_NAME, ORGHIER_ID FROM ORG_HIER)B CONNECT BY PRIOR (VER_ID‖BUS_GRP_NO‖EMPNO=VER_ID‖BUS_GRP_NO‖MGR) START WITH MGR=0)

In order to construct the second SQL statement for calculating the hierarchy level combined with the aggregate values, a string is constructed that prepares the SQL generated statement generated above for joining with the SQL segment for calculating the number of subordinates described below.

The second statement is comprised of several strings. The first of these strings is known as the outer aggregate values string. Its composition depends on the number of values entered into User Input 6. If no values are entered then the string is left empty. If one aggregate item is entered then the string is as follows:

"'‖User_input_6‖'_treesum", "'‖User_input_6‖'_leafsum"

If more than one value has been entered into User Input 6 then a string is created for each value and all the strings are concatenated but separated by commas.

In Example 1, there are two values of User Input 6, SAL and COMM, so the resultant string is:

"SAL_treesum", "SAL_leafsum", "COMM_treesum", "COMM_leafsum"

Example 2 has no values for User Input 6 and so no string is created.

The next string to be created is the outer key values string. The creation follows the same pattern as for the outer aggregate values string but is based on User Input 5. If User Input 5 values exist then the string is:

"'‖User_input_5‖'"

If more than one value exists then a string for each value is concatenated to form a comma separated string.

Example 1 has no value entered for User Input 5 and so no string is created.

Example 2 has two values for User Input 5 and so the following string is created:

"BUS_GRP_NO", "VER_ID"

The next string is known as the outer primary key string. It is generated following the same principal as the outer key values string but based on User Input 7. If User Input 7 values exist then the string is:

"‖User_input_7‖'_pk"

If User Input 7 has no value then no string is created.

For Example 1 the following string is created:

"EMPNO_pk"

For Example 2 the following string is created:

"ORGHIER_ID_pk"

The four strings generated above are then combined to form the second SQL statement, known as the final outer level aggregation SQL statement, as shown below:

(SELECT LVL, <INSERT OUTER KEY VALUES STRING>, <INSERT OUTER AGGREGATE VALUES STRING>,<INSERT OUTER PRIMARY KEY STRING>,' "‖User_input_2‖" ',' "‖User_input_3‖" 'FROM <INSERT BASIC SQL OBJECT GENERATED ABOVE>‖' B CONNECT BY PRIOR '21 INSERT CONNECT BY STRING>' START WITH '‖User_input_2‖' <INSERT START POUNT STRING>) X This SQL statement can be run or validated, at this point, against the database to check for syntactical errors.

For Example 1, the second SQL statement is generated as follows:

(SELECT LVL, "SAL_TREESUM", "SAL_LEAFSUM", "COMM_TREESUM", "COMM_LEAFSUM"$_1$, "EMPNO_PK", "MGR", "EMPNO" FROM (SELECT LEVEL AS LVL, TREE_SAL(EMPNO) AS "SAL_TREESUM", LEAF_SAL(EMPNO) AS "SAL_LEAFSUM", TREE_COMM(EMPNO) AS "COMM_TREESUM", LEAF_COMM(EMPNO) AS "COMM_LEAFSUM", EMPNO AS "EMPNO_PK", MGR, EMPNO FROM (SELECT MGR, EMPNO, SAL, COMM FROM EMP) B CONNECT BY PRIOR EMPNO=MGR START WITH MGR IS NULL) X

Example 2 requires no aggregation and so the following statement is generated:

(SELECT LVL, "BUS_GRP_NO", "VER_ID", "ORGHIER_ID_PK", "MGR", "EMPNO" FROM (SELECT LEVEL AS LVL, BUS_GRP_NO AS "BUS_GRP_NO", VER_ID AS "VER_ID", ORGHIER_ID AS "ORGHIER_ID_pk.", MGR AS "MGR", EMPNO AS "EMPNO", FROM (SELECT MGR, EMPNO, VER_ID, BUS_GRP_NO, ORG_NAME, ORGHIER_ID FROM ORG_HIER)B CONNECT BY PRIOR (VER_ID‖BUS_GRP_NO‖EMPNO=VER_ID‖BUS_GRP_NO‖MGR) START WITH MGR=0) X

It is now necessary to construct the SQL segment for calculating the number of subordinates for each record in the hierarchy.

In order to do this, a string known as the subordinates connect by string is first created from the values of User Input 5 concatenated with the values of the parent items and the child items from User Inputs 2 and 3 respectively. The string is created as shown below:

User_input_5‖'‖'‖User_input_2‖'='‖User_input_5‖'‖'‖User_$_3$ input_3

If no values exist for 'User Input 5' then the following string is created instead:

User_input_1‖'='‖User_input_3

If more than one value exists for 'User Input 5' then the strings created for each item are concatenated.

With respect to Example 1, no User Input 5 values exist and so the following string is created:

(MGR=EMPNO)

In Example 2, two values exist for User Input 5 and so two strings are created and concatenated:

(VER_ID‖BUS_GRP_NO‖MGR=VER_ID‖BUS_GRP_NO‖EMPNO)

An SQL statement, known as the subordinates select SQL statement, is then created from this string to find the number of aggregates at each of the node points in the hierarchy:

'(SELECT SUBORDINATES, ' ‖User_input_5‖',' ‖User_input_2‖',' ‖User_input_3‖',' ‖User_input _‖' FROM (SELECT COUNT(*) −1 AS SUBORDINATED, '‖User_input_5‖',' ‖User_input_2‖',' ‖User_input_3‖',' ‖User_input_7‖' FROM ('‖<INSERT BASIC SQL OBJECT GENERATED ABOVE>‖') B CONNECT BY PRIOR'<INSERT SUBORDINATES CONNECT BY STRING>'GROUP BY '‖User_input_5‖',' ‖User_input_2‖',' ‖User_input_3‖', '‖User_input_7‖')) Y'

If User Input 5 has no values then it is omitted from the SQL statement shown above. If User Input 5 contains more than one value, each value is included but they are separated by commas.

If User Input 7 has no values or if it is identical to User Input 3 then it is omitted from the SQL statement shown above.

This SQL statement can be run or validated, at this point, against the database to check for syntactical errors.

In the case of Example 1, the SQL segment for calculating the number of subordinates is:

(SELECT SUBORDINATES, MGR, EMPNO, FROM (SELECT COUNT(*)−1 AS SUBORDINATES, MGR,EMPNO FROM (SELECT MGR, EMPNO, SAL, COMM FROM EMP) B CONNECT BY PRIOR (MGR=EMPNO) GROUP BY MGR, EMPNO))Y

In the case of Example 2, the corresponding SQL segment is:

(SELECT SUBORDINATES, BUS_GRP_NO, VER_ID, MGR, EMPNO, ORGHIER_ID FROM (SELECT COUNT (*)−1 AS SUBORDINATES, BUS_GRP_NO, VER_ID,MGR, EMPNO, ORG_HIER_ID FROM (SELECT MGR, EMPNO, VER_ID, BUS_GRP_NO, ORG_NAME, ORGHIER_ID FROM ORG_HIER)B CONNECT BY PRIOR (VER_ID||BUS_GRP_NO||MGR=VER_ID||BUS_GRP_NO|| EMPNO) GROUP BY BUS_GRP_NO, VER_ID, MGR, EMPNO, ORGHIER_ID))Y

As previously described, the SQL segments generated for calculating the tree and leaf sum aggregates, the level and number of subordinates are combined into a final SQL statement. In order to do this, two strings are first created.

The first string, known as the key select string is created from the values of User Input 7 provided. It is created as:

""||User_input_7||'_pk"'

However, if there is no value for User Input 7 then the key select string is:

""||User_input_3||"', "'||User_input_5||"', '||

If User Input 5 contains more than one value then each value is concatenated in a comma separated format.

If there are no values for both User Input 7 and User Input 5 then the key select string is:

""||User_input_3||"'

In the case of Example 1, the key select string is:

"EMPNO_pk"

In the case of Example 2, it is:

"ORGHIER_ID_pk"

In both examples values of User Input 7 exist, but to illustrate the point, if they did not, then the strings would be instead:

Example 1: "EMPNO"

Example 2: "EMPNO", "BUS_GRP_NO", "VER_ID"

The next string is known as the where clause string. It is constructed from the input values provided as shown below:

WHERE x."'||User_input_2||"'=y.'||User_input_2|| (+) AND x."'||User_input_3||"'=y.'||User_input_3|| (+) AND x."'||User_input_5||"'=y.'||User_input_5|| (+)'

If no values exist for User Input 5 then the string is modified such that it does not refer to this as is shown below with respect to Example 1. If User Input 5 has more than one value then each value is repeated and concatenated to the end of the string as is shown below with respect to Example 1:

In the case of Example 1, where no User Input 5 values exist, the where clause string is:

'WHERE x."MGR"=y.MGR(+) AND x."EMPNO"=y.EMPNO(+)'

In the case of Example 2, where two User Input 5 values are provided, the where clause string is:

'WHERE x."MGR"=y.MGR(+) AND x."EMPNO"=y.EMPNO(+) AND x. "VER_ID"=y.VER_ID (+) AND x."BUS_GRP_NO"=y.BUS_GRP_NO(+)'

All the dynamically created SQL segments together with the key select and where clause strings are combined into a single SQL statement as shown:

SELECT LVL, SUBORDINATES, <INSERT OUTER AGGREGATE VALUES STRING>, <INSERT KEY SELECT STRING> FROM <INSERT FINAL OUTER LEVEL AGGREGATION SQL STATEMENT>, <INSERT SUBORDINATES SELECT SQL STATEMENT> <INSERT WHERE CLAUSE STRING>

This dynamic SQL statement once created can be run or validated on the database to check for syntactical errors.

In the case of Example 1, the following final SQL statement is generated:

SELECT LVL, SUBORDINATES, "SAL_TREESUM", "SAL_LEAFSUM", "COMM_TREESUM", "COMM_LEAFSUM", "EMPNO_PK" FROM (SELECT LVL, "SAL_TREESUM", "SAL_LEAFSUM", "COMM_TREESUM", "COMM_LEAFSUM", "EMPNO_PK", "MGR", "EMPNO" FROM (SELECT LEVEL AS LVL, TREE_SAL (EMPNO) AS "SAL_TREESUM", LEAF_SAL(EMPNO) AS "SAL_LEAFSUM", TREE_COMM(EMPNO) AS "COMM_TREESUM", LEAF_COMM(EMPNO) AS "COMM_LEAFSUM", EMPNO AS "EMPNO_PK", MGR, EMPNO FROM (SELECT MGR, EMPNO, SAL, COMM FROM EMP) B CONNECT BY PRIOR EMPNO=MGR START WITH MGR IS NULL) X (SELECT SUBORDINATES, MGR, EMPNO, FROM (SELECT COUNT(*)−1 AS SUBORDINATES, MGR,EMPNO FROM (SELECT MGR, EMPNO, SAL, COMM FROM EMP) B CONNECT BY PRIOR (MGR=EMPNO) GROUP BY MGR, EMPNO)) Y> 'WHERE X."MGR"=Y.MGR(+) AND X."EMPNO"=Y.EMPNO(+)'

For Example 2, the final SQL statement is:

SELECT LVL, SUBORDINATES, "ORGHIER_ID_PK" FROM (SELECT LVL, "BUS_GRP_NO", "VER_ID", "ORGHIER_ID_PK", "MGR", "EMPNO" from (SELECT LEVEL AS LVL, BUS_GRP_NO AS "BUS_GRP_NO", VER_ID AS "VER_ID", ORGHIER_ID AS "ORGHIER_ID_PK", MGR AS "MGR", EMPNO AS "EMPNO", FROM (SELECT MGR, EMPNO, VER_ID, BUS_GRP_NO, ORG_NAME FROM ORG_HIER)B CONNECT BY PRIOR (VER_ID||BUS_GRP_NO||EMPNO=VER_ID||BUS_GRP_ NO||MGR) START WITH MGR=0) X (SELECT SUBORDINATES, BUS_GRP_NO, VER_ID, MGR, EMPNO, ORGHIER_ID FROM (SELECT COUNT(*)−1 AS SUBORDINATES, BUS_GRP_NO, VER_ID,MGR, EMPNO, ORGHIER_ID FROM (SELECT MGR, EMPNO, VER_ID, BUS_GRP_NO, ORG_NAME, ORGHIER_ID FROM ORG_HIER)B CONNECT BY PRIOR (VER_ID||BUS_GRP_NO||MGR=VER_ID||BUS_GRP_NO|| EMPNO) GROUP BY BUS_GRP_NO, VER_ID, MGR, EMPNO, ORGHIER_ID))Y WHERE X."MGR"=Y.MGR (+) AND X."EMPNO"=Y.EMPNO(+) AND X."VER_ID"=Y.VER_ID(+) AND X."BUS_GRP_NO"=Y.BUS_GRP_NO(+)

The final SQL statement, once it has been created, can be hidden inside a database object such as a view, using the following SQL statement:

'CREATE VIEW'|| User_input_1||'_VH AS (<INSERT FINAL SQL STATEMENT STRING>);'

This view can then be dynamically generated and treated like a table and be used by analysis tools (such as Discoverer) to extract information on hierarchy levels, number of subordinates, hierarchical node aggregation and node identification (leaf or tree). This can be done without the analysis tool having to generate any special SQL syntax, for example using CONNECT BY or START WITH clauses For Example 1, a seven-column view is created as defined below:

CREATE VIEW EMP_VH AS (SELECT LVL, SUBORDINATES, "SAL_TREESUM", "SAL_LEAFSUM", "COMM_TREESUM", "COMM_LEAFSUM", "EMPNO_PK" FROM (SELECT LVL, "SAL_TREESUM", "SAL_LEAFSUM", "COMM_TREESUM", "COMM_LEAFSUM", "EMPNO_PK", "MGR", "EMPNO" FROM (SELECT LEVEL AS LVL, TREE_SAL(EMPNO) AS "SAL_TREESUM", LEAF_SAL(EMPNO) AS "SAL_LEAFSUM", TREE_COMM(EMPNO) AS "COMM_TREESUM", LEAF_COMM(EMPNO) AS "COMM_LEAFSUM", EMPNO AS "EMPNO_PK", MGR, EMPNO FROM (SELECT MGR, EMPNO, SAL, COMM FROM EMP) B CONNECT BY PRIOR EMPNO=MGR START WITH MGR IS NULL) X (SELECT SUBORDINATES, MGR, EMPNO, FROM (SELECT COUNT(*)–1 AS SUBORDINATES, MGR,EMPNO FROM (SELECT MGR, EMPNO, SAL, COMM FROM EMP) B CONNECT BY PRIOR (MGR=EMPNO) GROUP BY MGR, EMPNO))Y> 'WHERE X."MGR"=Y.MGR(+) AND X."EMPNO"=Y.EMPNO(+)')

The seven column view will contain the following columns:

| Column Number | Column Name | Description |
|---|---|---|
| 1 | EMPNO_PK | Primary Key |
| 2 | LVL | A pseudo column that interrogates the hierarchy to find, for each row of data, its level within the hierarchy |
| 3 | SUBORDINATES | The number of subordinate rows of data for this record within the hierarchy |
| 4 | SAL_TREESUM | Tree sum aggregation for SAL |
| 5 | SAL_LEAFSUM | Leaf sum aggregation for SAL |
| 6 | COMM_TREESUM | Tree sum aggregation for COMM |
| 7 | COMM_LEAFSUM | Leaf sum aggregation for COMM |

If desired, this seven column view can then be joined back the EMP table shown in FIG. 1 using a one to one join between the EMPNO column of EMP and EMPNO_PK column of the view. A user is then able to select an employee and extract, via the join, the employees level, number of subordinates, SAL tree and leaf sum and COMM leaf and tree sum without the user having to enter any complex SQL.

In the case of Example 2 a three column view is created:

CREATE VIEW ORG_HIER_VH AS (SELECT LVL, SUBORDINATES, "ORGHIER_ID_PK" FROM (SELECT LVL, "BUS_GRP_NO", "VER_ID", "ORGHIER_ID_PK", "MGR", "EMPNO" FROM (SELECT LEVEL AS LVL, BUS_GRP_NO AS "BUS_GRP_NO", VER_ID AS "VER_ID", ORGHIER_ID AS "ORGHIER_ID_PK", MGR AS "MGR", MPNO AS "EMPNO", FROM (SELECT MGR, EMPNO, VER_ID, BUS_GRP_NO, ORG_NAME, ORGHIER_ID FROM ORG_HIER)B CONNECT BY PRIOR (VER_ID‖BUS_GRP_NO‖EMPNO=VER_ID‖BUS_GRP_NO‖MGR) START WITH MGR=0) X (SELECT SUBORDINATES, BUS_GRP_NO, VER_ID, MGR, EMPNO, ORGHIER_ID FROM (SELECT COUNT(*)–1 AS SUBORDINATES, BUS_GRP_NO, VER_ID, EMPNO, ORGHIER_ID FROM (SELECT MGR, EMPNO, VER_ID, BUS_GRP_NO, ORG_NAME, ORGHIER_ID FROM ORG_HIER)B CONNECT BY PRIOR (VER_ID‖BUS_GRP_NO‖MGR=VER_ID‖BUS_GRP_NO‖EMPNO) GROUP BY BUS_GRP_NO, VER_ID, MGR, EMPNO, ORGHIER_ID))Y WHERE X."MGR"=Y.MGR(+) AND X."EMPNO"=Y.EMPNO(+) AND X."VER_ID"=Y.VER_ID(+) AND X."BUS_GRP_NO"=Y.BUS_GRP_NO(+))

The three column view will contain the following columns:

| Column Number | Column Name | Description |
|---|---|---|
| 1 | ORGHIER_ID_PK | Primary Key |
| 2 | LVL | Pseudo column that interrogates the hierarchy to find, for each row of data, its level within the hierarchy |
| 3 | SUBORDINATES | The number of subordinate rows of data for this record within the hierarchy |

This view can then be joined to the ORG_HIER table shown in FIG. 6 using a one to one join between the ORGHIER_ID column of ORG_HIER table and the ORGHIER_ID_PK column of the view. A user can then extract level and number of subordinates data for each record in ORG_HIER.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

We claim:

1. A computer implemented method for extracting hierarchical data from one or more tables in a database, the method comprising:
   a. receiving user input identifying, at least, one or more tables in the database that contain the hierarchical data and a hierarchical structure of the hierarchical data;
   b. generating a Structured Query Language (SQL) statement using the user input received in step (a);
   c. presenting the SQL statement to the database for execution, wherein the SQL statement is generated from the user input by
      i. constructing object SQL statements executable to return all the database items identified by the user input;
      ii. constructing object SQL statements executable to calculate a level of an item in the hierarchical structure;

iii. constructing object SQL statements executable to calculate a number of child items appendant to an item in the hierarchical structure; and,
iv. combining the object SQL of steps (i) to (iii) to form a single object SQL statement; and,
d. extracting the hierarchical data from the database in response to execution of the SQL statement.

2. A method according to claim 1, wherein the user input identifying the hierarchical structure indicates at least a column of one of the database tables that represents parent items of the hierarchical structure and a column of one of the database tables that represents the child items of the hierarchical structure.

3. A method according to claim 2, wherein a data value that is a top of the hierarchical structure has a default value of NULL.

4. A method according to claim 2, wherein the user input identifying the hierarchical structure indicates a data value in the column representing the parent items that is a top of the hierarchical structure.

5. A method according to claim 2, wherein the user input identifying the hierarchical structure indicates at least one further column of one of the tables that further restricts the hierarchy.

6. A method according to claim 1, wherein, prior to generating the SQL statement, further user input is received, the user input indicating at least one column of one of the database tables on which leaf sum aggregation should be performed.

7. A method according to claim 1, wherein, prior to generating the SQL statement, further user input is received, the user input indicating at least one column of one of the database tables on which tree sum aggregation should be performed.

8. A method according to claim 6, wherein the SQL statement is generated from the user input by:

i. constructing object SQL statements executable to return all the database items identified by the user input;
ii. constructing object SQL statements executable to calculate a level of an item in the hierarchical structure;
iii. constructing object SQL statements executable to calculate a number of child items appendant to an item in the hierarchical structure;
iv. constructing object SQL statements executable to perform a leaf sum aggregation; and
v. combining the object SQL of steps (i) to (iv) to form a single object SQL statement.

9. A method according to claim 7, wherein the SQL statement is generated from the user input by:

i. constructing object SQL statements executable to return all the database items identified by the user input;
ii. constructing object SQL statements executable to calculate a level of an item in the hierarchical structure;
iii. constructing object SQL statements operable to cause a computer to calculate a number of child items appendant to an item in the hierarchical structure;
iv. constructing object SQL statements executable to perform a tree sum aggregation; and,
v. combining the object SQL of steps (i) to (iv) to form a single object SQL statement.

10. A computer program comprising computer program code means adapted to perform the steps of claim 1 when said program is run on a computer.

11. A computer program product comprising program code means stored on a computer readable medium for performing the method of claim 1 when said program product is run on a computer.

* * * * *